United States Patent [19]

Langsam et al.

[11] Patent Number: 4,759,776
[45] Date of Patent: Jul. 26, 1988

[54] POLYTRIALKYLGERMYLPROPYNE POLYMERS AND MEMBRANES

[75] Inventors: Michael Langsam, Allentown; Ann C. L. Savoca, Reading, both of Pa.

[73] Assignee: Air Products and Chemicals, Inc., Allentown, Pa.

[21] Appl. No.: 939,312

[22] Filed: Dec. 8, 1986

[51] Int. Cl.$^4$ .................. B01D 59/10; C08D 5/20
[52] U.S. Cl. .......................................... 55/16; 55/158;
521/27; 521/28; 525/328.1; 525/356; 526/240;
522/147; 210/500.27
[58] Field of Search .................... 526/240; 521/27, 28;
55/16, 158; 522/147; 210/500.27; 525/356

[56] References Cited

U.S. PATENT DOCUMENTS

| | | | |
|---|---|---|---|
| 4,020,223 | 4/1977 | Dixon et al. | 428/224 |
| 4,472,175 | 9/1984 | Malon et al. | 55/16 |
| 4,486,202 | 12/1984 | Malon et al. | 55/158 |

FOREIGN PATENT DOCUMENTS

| | | |
|---|---|---|
| 85303088.0 | 1/1985 | European Pat. Off. |
| 2135319A | 8/1984 | United Kingdom |

OTHER PUBLICATIONS

Bulletin De La Societe Chimique De France, 1983, No. 1–2, J. Braun et al, I116–I120.

Advances in Pol. Sci., "Catalytical and Radical Polymerization"–Spring Verlag, New York, 1986, pp. 122–165.

Journal of Org. Chem., vol. 52, No. 4, pp. 663–667, S. M. Moerlein.

Chem. Abstracts, vol. 96, entry 52426v, Tatorenko et al. AICHE Symposium Series, No. 229, vol. 79, p. 172, "Membrane Separation Processes for Acid Gases", S. S. Kulkarni et al.

*Primary Examiner*—Joseph L. Schofer
*Assistant Examiner*—Peter F. Kulkosky
*Attorney, Agent, or Firm*—Mark L. Rodgers; William F. Marsh; James C. Simmons

[57] ABSTRACT

The present invention is a group of new polymers and treated, semi-permeable, polymeric membranes made from the new polymers, having improved selectivity for separating components of a gas mixture. The membrane is provided by fluorinating a polymer cast into membrane form, having the general structural formula:

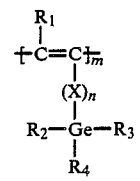

wherein $R_1$ is H or a $C_1$–$C_2$ alkyl group; $R_2$ and $R_3$ are independently linear or branched $C_1$–$C_6$ alkyl groups; $R_4$ is a linear or branched $C_1$–$C_{12}$ alkyl or aryl group; X is a $C_1$–$C_3$ alkyl group or phenyl; m is at least 100; and n is 0 or 1.

47 Claims, No Drawings

POLYTRIALKYLGERMYLPROPYNE POLYMERS AND MEMBRANES

TECHNICAL FIELD OF THE INVENTION

The present invention relates to polymeric membranes which are used to separate components of a gas mixture. It also relates to gas separation processes using the polymeric membranes.

BACKGROUND OF THE INVENTION

A review of emerging technology using membranes to separate acid gases such as $CO_2$, $H_2S$ and $SO_2$ from gas streams is disclosed by S. Kulkarni, et al. in an article entitled, "Membrane Separation Processes for Acid Gases," AIChE Symposium Series (1983). Both currently available and potential polymer membranes for the separation of $CO_2$ from natural gas are discussed. The permeation characteristics of various types of membranes, such as asymmetric cellulose esters, multicomponent polysulfone/silicon rubber, ultrathin polyetherimide, and ultrathin silicone rubber/polycarbonate, were calculated for $CO_2/CH_4$ gas mixtures.

U.S. Pat. No. 4,486,202 discloses gas separation membranes exhibiting improved gas separation selectivity. A preformed, asymmetrical gas separation membrane having selective permeation of at least one gas in a gaseous mixture over that of one or more remaining gases in the gaseous mixture, is contacted on one or both sides with a Lewis acid. Contacting the asymmetrical membrane with a Lewis acid results in improved separation factors for the permeating gases. The patent also discloses a method for producing improved, asymmetrical membranes in flat film or hollow fiber form having improved gas separation properties by treatment with a volatile Lewis acid.

U.S. Pat. No. 4,472,175 discloses gas separation membranes exhibiting improved gas separation selectivity. In this patent, a preformed, asymmetrical gas separation membrane, having selective permeation for at least one gas in a gaseous mixture over that of one or more remaining gases in a gaseous mixture, is contacted on one or both sides with a Bronsted-Lowry acid. Contacting the asymmetrical membrane with a Bronsted-Lowry acid results in improved separation factors for the permeating gases. Additionally, this patent discloses a method for producing improved, asymmetric membranes in flat film or hollow fiber form having improved gas separation properties by treatment with a Bronsted-Lowry acid.

U.K. Patent Application No. 2135319A discloses a membrane having improved permeability for a variety of gases. The membrane is formed from a polymer having repeating units of the formula:

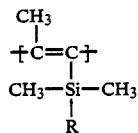

wherein R is an alkyl radical having 1-12 carbon atoms. The polymer is dissolved in one or more solvents, such as aliphatic hydrocarbons, to form a polymer solution which is cast to form a film. The membranes may be produced in any form, such as plain film, tubular and hollow fibrous forms and, if necessary, may be supported on one or more backing layers to form composites.

U.S. Pat. No. 4,020,223 discloses a method of modifying the surface of synthetic resins selected from the group consisting of polyolefins and polyacrylonitriles by treatment with a fluorine-containing gas. The fluorinated resin fibers exhibit good soil release and good water adsorption or moisture transport properties.

European Patent Application No. 85303088.0 discloses a polymer of a silyl acetylene compound for gas separation processes. The surface of the polymer is exposed to an atmosphere of low temperature plasma of an inorganic gas.

BRIEF SUMMARY OF THE INVENTION

The present invention is a high molecular weight, air stable polymer formed by polymerizing trialkylgermylacetylene derived monomers in the presence of a catalytic amount of a Group V or VI metal halide. The resultant polymer can be cast into membrane form and has the general structural formula:

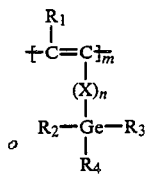

Wherein $R_1$ is H or a $C_1$-$C_2$ alkyl group; $R_2$ and $R_3$ are independently linear or branched $C_1$-$C_6$ alkyl groups; $R_4$ is a linear or branched $C_1$-$C_{12}$ alkyl or aryl group; X is a $C_1$-$C_3$ alkyl group or phenyl; m is at least 100; and n is 0 or 1. These membranes generally exhibit high permeabilities for a wide range of gases. The separation factor; i.e., selectivity, which is defined to be the ratio of permeability of two gases can be enhanced in membranes having the polymeric structure wherein $R_2$, $R_3$, and $R_4$ are $C_1$-$C_3$ alkyl groups by contacting the membrane with a reactive source of fluorine for a time sufficient to modify the surface of the membrane. Preferably the fluorine treatment will be such that the $O_2/N_2$ selectivity ratio of the membrane is increased by at least 50% over that of the membrane prior to contact with the reactive fluorine source.

The present treated; i.e., fluorinated, polymeric membranes exhibits good gas permeability properties with a significant increase in gas selectivity over the unfluorinated polymer. Increased selectivity of the membrane is achieved for a wide variety of gas streams which contain at least two compounds having different permeability rates through the membrane.

The present invention is also a process for separating feed gas mixtures containing at least two components having different permeabilities through the membrane, by bringing said feed gas mixture into contact with a treated, semi-permeable, polymeric membrane as described above.

DETAILED DESCRIPTION OF THE INVENTION

The present invention is polytrialkylgermylpropyne and similar high molecular weight, relatively air-stable, colorless polymers, and membranes made therefrom. The polymer is prepared by the rapid polymerization of trialkylgermylacetylene monomers in the presence of a catalytic amount; e.g. about 1-4% by weight of a Group V or VI metal halide such as TaCl$_5$, NbF$_5$, WCl$_6$, MoCl$_5$ and NbBr$_5$. The ratio of metal halide to trialkylgermylacetylene monomers may vary from about 0.1% to 10%. Optionally, a co-catalyt may be used in the polymerization reaction. Typical co-catalyts include alkyl aluminum compounds such as triethylaluminum, diethylaluminum chloride and others as well as bismuth and tin alkyl and aryl materials such as triphenylbismuth and tetraphenyltin.

The polymerization is carried out in an inert atmosphere using a wide range of organic solvents, typically aliphatic materials such as hexane, alicyclic materials such as cyclohexene or aromatic materials such as toluene or xylene. The monomer/solvent ratio can be from 1/10 to 10/1 through a 1/4 ratio has been used extensively. The polymerization can be run at a range of temperatures from 0° to 100° C. through a range of 50°–60° C. has been found to offer certain advantages. It was found that the polymerization time was extremely short; (i.e. about 2.5 seconds) for the trimethylgermylpropyne, whereas trimethylsilylpropyne and similar silyl compounds polymerize in about 4 hours under the same conditions.

The polymer can be synthesized from any suitable germyl yne-type monomers which can be polymerized to give the general structural formula:

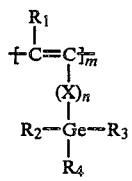

wherein $R_1$ is H or a $C_1$–$C_2$ alkyl group; $R_2$ and $R_3$ are independently linear or branched $C_1$–$C_6$ alkyl groups; $R_4$ is a linear or branched $C_1$–$C_{12}$ alkyl or aryl group; X is a $C_1$–$C_3$ alkyl group or phenyl; m is at least 100; and n is 0 or 1.

The resulting polymer was found to be soluble in carbon disulfide but insoluble in other organic solvents such as toluene and chloroform. This solvent resistance was unexpected with respect to polytrimethylgermylpropyne (PTMGP) since other trialkylgermylacetylene derived polymers, and all trialkylsilylacetylene derived polymers tested, including polytrimethylsilylpropyne, were found to be soluble in these solvents. Resistance of PTMGP to solvents such as these, allows membranes formed from this polymer to be useful in various solvent (i.e. liquid) separation processes, as well as gas separation processes particularly involving H$_2$/CH$_4$, CO$_2$/CH$_4$; and other gaseous hydrocarbon containing mixtures.

Optionally, the polymer structure may also include anywhere between <1% up to 98% of one or more copolymers. Preferably, such copolymers are trialkylsilylacetylene derived compounds such as polytrimethylsilylpropyne, although a wide variety and concentrations of copolymers can be incorporated into the polymer structure. The copolymers can be arranged as random, alternating or block structures, with the only requirement being that the copolymer contain trialkylgermylacetylene type monomer units in addition to any other type monomer units which can undergo copolymerization. While the structural formula recited above states that m is at least 100, if the structural units are part of a copolymer, the units may be randomly distributed throughout and do not necessarily have to form a homogeneous block. Specifically, it has been found that the solvent resistance demonstrated by PTMGP, as described above, is also exhibited by polymers having structures comprising up to 50% trialkylsilyacetylene derived monomers with the balance being trimethylgermylpropyne monomers.

While the polymer can have a wide range of molecular weights wherein m is at least 100, for handling and synthesis purposes it is preferred that m is less than 50,000. After it is synthesized, the polymer can be cast into membrane form. The membrane form may be any conventional type of membrane, such as a flat sheet, hollow fibers or spiral wound flat sheets. In addition to self-supporting layers, the polymer may be cast onto a suitable support to form a composite structure. Additionally, the membrane may comprise two or more layers, of which at least one layer comprises the abovedescribed polytrialkylgermylacetylene derived polymer or copolymer. One or more individual membranes may be incorporated into a module for use in separation operations.

The untreated polymeric membrane generally has high permeability values for a wide range of gases, but typically exhibits relatively poor gas selectivity and therefore is not suitable for many gas separation operations. To increase selectivity, membranes having polymeric structures wherein $R_2$, $R_3$ and $R_4$ are H or $C_1$–$C_3$ alkyl groups are fluorinated by contacting it with a reactive fluorine source. One such fluorination method involves contacting the membrane with a gas stream containing between 0.01%–25% elemental fluorine gas for a period of time between 10 seconds and 24 hours. Preferred fluorination techniques include a contact time between 0.5 and 120 minutes with a gas stream having a fluorine concentration between 0.1%–2% fluorine gas. In any case, fluorination should be sufficient to increase the O$_2$/N$_2$ selectivity ratio of the membrane at ambient temperature by at least 50%. A wide variety of elemental fluorine-containing gas streams can be used to fluorinate the film, such as F$_2$/O$_2$, F$_2$/N$_2$, F$_2$/Cl$_2$, F$_2$/O$_2$/N$_2$, F$_2$/Cl$_2$/N$_2$, F$_2$/SO$_2$/N$_2$, F$_2$/SO$_3$/N$_2$, F$_2$/SO$_2$Cl$_2$/N$_2$ and F$_2$/SO$_2$Cl/N$_2$, etc. Other sources of fluorine such as PF$_5$, AsF$_5$, BF$_3$, CH$_3$COF, etc. may also be used. If a high concentration, i.e. 10%–25%, of fluorine is to be used in the fluorination step, the fluorine concentration should be incrementally staged-up slowly to avoid burning the membrane. In addition to the above-described gas-phase fluorination, other fluorination techniques can be used. For example, a liquid containing fluorinating agents may be either volatized into a reactive gas atmosphere or the membrane may be coated or dipped into a dilute solution of a fluorine containing agent followed by a gas phase volatilization. While both sides of the polymeric membrane can be subjected to the fluorine treatment, it is preferred that only one surface of the membrane be treated, thereby forming an ultra-thin selective surface only on that side of the membrane, with the remainder of the membrane consisting of the highly permeable polymeric structure.

The interaction between the germanium containing polymer and the reactive atmosphere can be carried out under ambient conditions of temperature and pressure. Alternatively, the reaction may also be performed at elevated temperatures and in the presence of a plasma field, electromagnetic radiation, or ultraviolet radiation. In some instances, treatment in a plasma field or with electromagnetic or ultraviolet radiation may increase the selectivity or alter other properties of the membrane even in the absence of fluorine. If the membrane is to be incorporated into a module, treatment may optionally be carried out before or after the membrane is incorporated therein.

The fluorinated membrane exhibits greatly enhanced permselectivity for various gas mixtures, making it useful in many different gas separation operations. A gas stream containing two or more components is brought into contact with the membrane, and the permeate stream from the membrane is analyzed and measured to determine the permeability coefficient ($\overline{P}$) of the various gaseous component. Permeability coefficient can be measured by the following relationship:

$$P = \frac{J}{1} \cdot \frac{1}{A} \cdot \frac{L}{1} \cdot \frac{1}{\Delta p}$$

Where:
J is Flux
A is Area
L is Thickness
$\Delta p$ is Pressure

This relationship can be conveniently expressed in units of measurement termed Barrers. The relationship for Barrers is:

$$P \text{ in } \frac{scc}{sec} \cdot \frac{1}{cm^2} \cdot \frac{cm}{1} \cdot \frac{1}{cm(Hg)} \cdot 10^{+10}$$

Additionally, the permeance ($\overline{PL}$), as defined by Henis and Tripodi in their paper on resistance models, J. Memb. Sci. 8, 223 (1981), of the composite structure is also measured taking into account the area of the ultra thin surface layer. By comparing the permeability and/or permeance values for different gaseous components, a selectivity ($\alpha$) ratio for various gas mixtures can be calculated. It was found that the treated membrane structure of the present invention significantly increased the selectivity ratios of a wide number of gas mixtures. Examples of such gas mixtures include: $He/CH_4$, $He/N_2$, $H_2/CH_4$, $H_2/CO$, $H_2/N_2$, $CO_2/N_2$, $O_2/N_2$ and $CO_2/CH_4$. While the selectivity ratios of the above gas mixtures demonstrated a significant increase, it is expected that many other gas mixtures, both binary and multi-component mixtures, would also exhibit increased selectivity ratios. In addition to gas separations, the above-described membranes, either treated or untreated, may be suitable for other operations such as solvent separations, pervaporation or ultrafiltration.

It is believed that other treating agents will result in similar improvements in the characteristics of the present membranes to those which are achieved with fluorine treatment. Examples of these proposed equivalents include treatment with chlorine, bromine, $SO_3$, $CF_4$, conditioning in methanol and heat treatment.

EXPERIMENTAL

Synthesis of Polytrimethylgermylpropyne (PTMGP)

(a) Preparation of Trimethylgermylpropyne

A 1-liter, 3-neck reaction vessel was fitted with a mechanical stirrer, pressure-equalized addition funnel and a gas inlet with cold finger condenser. The flask was charged with methyllithium (0.13 liter of a 1.6M dilution in diethyl ether) and 0.225 liter of anhydrous diethyl ether under nitrogen atmosphere. The vessel was cooled to an external temperature of $-30°$ C. and the condenser was filled with dry ice and isopropanol. Propyne was then introduced via the gas inlet resulting in the formation of a viscous white slurry. The reaction mixture was allowed to warm to room temperature over two hours, and was then recooled to an external temperature of 0° C. and treated dropwise with trimethylgermanium chloride (24.8 g; 0.162 mole) over ten minutes. After stirring an additional 24 hours at room temperature, the product mixture was diluted with pentane and washed with distilled water to remove lithium salts. The organic layer was dried over anhydrous magnesium sulfate, filtered to remove drying agent and concentrated by distillation to remove the pentane. Distillation of the product at atmospheric pressure using a 15 mm×100 mm glass helices packed column afforded 19.2 g trimethylgermylpropyne (b.p. 109°-112° C.).

(b) Polymerization of Trimethylgermylpropyne 100 grams of Toluene was mixed with $TaCl_5$ catalyst and stirred for about 5 minutes until it dissolved to form a bright yellow solution. About 19 grams of trimethylgermylpropyne (TMGP) monomer was added and the solution immediately turned dark brown. Within seconds there was a noticeable increase in solution viscosity. After 24 hours the reaction mixture was quenched in methanol, washed with about 1000 ml of methanol and then dried, leaving a PTMGP Polymer.

The polymer produced, polytrimethylgermylpropyne, (PTMGP), has the structure:

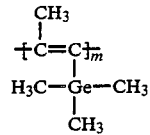

Wherein m is at least 100.

By varying the monomer (TMGP) to catalyst ($TaCl_5$) ratio, it is possible to control the molecular weight of the polymer. The resulting polymer is soluble in carbon disulfide but is not soluble in chloroform or toluene.

The polymerization technique described above was also carried out to attempt to polymerize trimethylstannylpropyne monomers to form polytrimethylstannylpropyne. Various Group V and VI metal halide catalysts were used in toluene for times ranging between 1.5 hours to 72 hours and at temperatures ranging from $-60°$ C. to 80° C. All attempts to form the desired polymer failed regardless of the catalysts or conditions employed. The inability to synthesize the stannyl polymer emphasizes the uniqueness of the polymerization reaction and resulting polymer of the present invention.

Both flat sheet PTMGP membranes and PTMGP membranes coated on a porous hollow fiber substrate were fabricated by dissolving the polymer in carbon disulfide at a weight ratio of 1/40 to form a 2.5% solution by weight. A portion of the carbon disulfide-polymer solution was cast on a clean, smooth glass surface using a 40 mil. doctor knife, and air dried using a stream of dry nitrogen. The polymer film ranged from about 25-75 microns in total thickness. The flat sheet membranes were removed from the solid glass support by soaking in water. The films easily floated off of the glass surface. The flat sheet membranes were mounted in a CSC-135 Permeation Cell (manufactured by Custom Scientific Corporation, Whippany, NJ) using the procedure described in an article by S. A. Stern, et al. in *Modern Plastics*, October 1964.

The same carbon disulfide-polymer solution was used for coating Celgard ® polypropylene porous hollow fiber using grade #X-20 of Celgard ® material manufactured by Celanese Chemical Corporation. The Celgard ® hollow fibers were dipped into the carbon disulfide-polymer solution twice to insure complete coverage of the outer surface of the fiber.

Several of the PTMGP membranes while still attached to the glass supports, were fluorinated in a gas phase batch reactor with various fluorine/nitrogen mixtures. The membranes were placed in the reactor and the gas space was purged for 4 hours with nitrogen to remove ambient air. Pre-set ratios of $F_2/N_2$ were then flowed through the reactor space for pre-determined periods of time.

Several PTMGP membranes were fluorinated according to the above technique using different fluorine gas concentrations. A study of the surface composition of the PTMGP membranes before (control) and after fluorination indicates a drastic alteration in the surface of the membrane. The surface compositions of the fluorinated membranes and two unfluorinated PTMGP membranes were analyzed, and the results are reported in Table 1 below.

TABLE 1

| XPS* Analysis of PTMGP Samples | | | | |
|---|---|---|---|---|
| Fluorination Conditions | % C | % F | % Ge | % O |
| Control | 85.7 | None | 11.6 | 2.7 |
| Control | 83.0 | None | 10.4 | 6.6 |
| 25 counts** $F_2$ | 51.4 | 37.5 | 3.4 | 7.7 |
| 25 counts $F_2$ | 53.0 | 35.9 | 3.6 | 7.5 |
| 50 counts $F_2$ | 50.1 | 39.1 | 2.7 | 8.1 |
| 100 counts $F_2$ | 47.2 | 43.0 | 2.7 | 7.1 |
| 200 counts $F_2$ | 45.8 | 41.9 | 2.3 | 10.0 |

*X-ray photoelectron spectroscopy.
**1 count = 1 cc $F_2$ in 250 cc $N_2$/0.1 min.

The surface analysis reported in Table 1 shows a significant decrease in both the carbon and germanium contents on the surface of the fluorinated membranes. The oxygen concentration shown for the control samples represents water which is adsorbed on the surface of the polymer.

Several other polytrialkylgermylpropyne (PTAGP) membranes were synthesized and fluorinated in a gas phase batch reactor in accordance with the above procedures. The fluorinated PTAGP membranes were recovered from the reactor and subsequently removed from the glass supports by a water wedge technique. The membranes were measured for total thickness and subsequently mounted in the CSC-135 Permeation Cells for gas permeability and selectivity studies.

Gas permeability and selectivity studies using the PTAGP membranes treated with various fluorine concentrations and contact times were carried out and are reported in the examples below. These examples are meant only to illustrate the present invention and are not meant to be limiting.

EXAMPLE 1

One unfluorinated and one fluorinated flat sheet PTMGP polymer membrane samples were mounted in separate CSC permeation cells such that pressurized gas mixtures could be passed over the membrane surface and the permeate stream could be measured on the permeate side of the membrane by a volumetric flow device.

The permeability ($\bar{P}$), permeance ($\bar{P}L$), and selectivity ($\alpha$) of various gases through the membranes are reported in Tables 2 and 3 below.

TABLE 2

| Permeability and Permeance | | | |
|---|---|---|---|
| | Membrane Thickness (cm)[1] | Unfluorinated 28.1 | Fluorinated 27.0 |
| Fluorination | | | |
| | Time (min.) | | 90 sec. |
| | cc/$N_2$/min. | | 100 |
| | cc/$F_2$/min. | | 1 |
| | $F_2$ % | | 1 |
| | $F_2$ (counts) | | 15 |
| $H_2$ | | | |
| | $\bar{P}^{(2)}$ | 7,138 | 4,156 |
| | $\bar{P}/L^{(3)}$ | | 36.8 |
| He | | | |
| | $\bar{P}^{(2)}$ | 2,702 | 2,450 |
| | $\bar{P}/L^{(3)}$ | | 97.3 |
| $O_2$ | | | |
| | $\bar{P}^{(2)}$ | 3,954 | 667 |
| | $\bar{P}/L^{(3)}$ | | 2.98 |
| $N_2$ | | | |
| | $\bar{P}^{(2)}$ | 2,610 | 154 |
| | $\bar{P}/L^{(3)}$ | | 0.16 |
| $CH_4$ | | | |
| | $\bar{P}^{(2)}$ | 6,740 | 67 |
| | $\bar{P}/L^{(3)}$ | | 0.25 |
| CO | | | |
| | $\bar{P}^{(2)}$ | 2,940 | 182 |
| | $\bar{P}/L^{(3)}$ | | 0.72 |
| $CO_2$ | | | |
| | $\bar{P}^{(2)}$ | 15,770 | 2,770 |
| | $\bar{P}/L^{(3)}$ | | 12.45 |

[1] $\times 10^{+4}$
[2] Permeability Coefficient for the Composite Membrane ($\times 10^{+10}$)
[3] Permeance of the fluorinated surface layer ($\times 10^{+5}$)

TABLE 3

| SELECTIVITY | | | |
|---|---|---|---|
| | Membrane Thickness (cm)[1] | Unfluorinated 28.1 | Fluorinated 27.0 |
| Fluorination | | | |
| | Time (min.) | | 90 sec. |
| | cc/$N_2$/min. | | 100 |
| | cc/$F_2$/min. | | 1 |
| | $F_2$ % | | 1 |
| | $F_2$ (cc total) | | 15 |
| $O_2/N_2$ | | | |
| | $\alpha^{(2)}$ | 1.51 | 4.33 |
| | $\alpha^{(3)}$ | | 4.90 |
| $He/CH_4$ | | | |
| | $\alpha^{(2)}$ | 0.40 | 36.6 |
| | $\alpha^{(3)}$ | | 388 |
| $H_2/CH_4$ | | | |
| | $\alpha^{(2)}$ | 1.06 | 62.0 |
| | $\alpha^{(3)}$ | | 147 |
| $H_2/CO$ | | | |
| | $\alpha^{(2)}$ | 2.43 | 23.8 |
| | $\alpha^{(3)}$ | | 51.2 |
| $CO_2/CH_4$ | | | |
| | $\alpha^{(2)}$ | 2.30 | 41.3 |
| | $\alpha^{(3)}$ | | 49.6 |
| $CO_2/N_2$ | | | |
| | $\alpha^{(2)}$ | 6.04 | 18.0 |
| | $\alpha^{(3)}$ | | 20.5 |

[1] $\times 10^{+4}$
[2] Selectivity based on permeability coefficient ($\bar{P}$) of the composite membrane
[3] Selectivity based on permeance ($\bar{P}/l$) of the fluorinated surface layer.

The results reported in Tables 2 and 3 above for the gas permeability and selectivity tests, show a significant increase in membrane selectivity of the fluorinated membranes for all six gas mixtures tested. For example, the $O_2/N_2$ selectivity ratio of the PTMGP membrane showed over a two-fold increase for the membrane when fluorinated with 1.0% $F_2$ gas for 1.5 minutes.

The polymeric structures of the membranes tested and the results of the gas permeability studies are reported in Tables 4 and 5 below.

TABLE 4

| | PERMEABILITY AND PERMEANCE | | | | | | | | |
|---|---|---|---|---|---|---|---|---|---|
| PTAGP Membrane | $R_1 = R_2 = R_3 = CH_3$ Control | Fluorinated[1] | $R_1 = CH_3$ $R_2 = R_3 =$ $R_4 = CH_2H_5$ Control | Fluorinated | $R_1 = CH_3$ $R_2 = R_3 = CH_3$ $R_4 = C_4H_9$ Control | Fluorinated | $R_1 = CH_3$ $R_2 = R_3 = CH_3$ $R_4 = C_6H_5$ Control | Fluorinated |
| $H_2$ | | | | | | | | | |
| $\bar{P}^{(2)}$ | 7100 | 2400 | 2300 | 1100 | 73 | 58 | 17 | 20 |
| $\bar{P}/L^{(3)}$ | | 13.5 | | 6.3 | | 0.7 | | — |
| He | | | | | | | | | |
| $\bar{P}^{(2)}$ | 2700 | 2200 | 1000 | 580 | 48 | 40 | 11 | 12 |
| $\bar{P}/L^{(3)}$ | | 40 | | 4.4 | | 0.6 | | — |
| $O_2$ | | | | | | | | | |
| $\bar{P}^{(2)}$ | 4000 | 250 | 900 | 250 | 2.3 | 17 | 4 | 4.1 |
| $\bar{P}/L^{(3)}$ | | 1 | | 1.0 | | 0.2 | | — |
| $N_2$ | | | | | | | | | |
| $\bar{P}^{(2)}$ | 2600 | 37 | 750 | 50 | 8 | 8 | 1.4 | 0.8 |
| $\bar{P}/L^{(3)}$ | | 0.14 | | 0.2 | | 0.5 | | 0.04 |
| $CH_4$ | | | | | | | | | |
| $\bar{P}^{(2)}$ | 6700 | 17 | 1600 | 40 | 17 | 16 | 1.3 | 1.1 |
| $\bar{P}/L^{(3)}$ | | 0.06 | | 0.1 | | 1.0 | | 0.01 |
| CO | | | | | | | | | |
| $\bar{P}^{(2)}$ | 3000 | 47 | 900 | 70 | 10 | 8 | 3.5 | 2.5 |
| $\bar{P}/L^{(3)}$ | | 0.18 | | 0.2 | | 0.1 | | 0.01 |
| $CO_2$ | | | | | | | | | |
| $\bar{P}^{(2)}$ | 1600 | 420 | 3500 | 950 | 76 | 51 | 15 | 17 |
| $\bar{P}/L^{(3)}$ | | 1.6 | | 3.9 | | 0.4 | | — |
| Ar | | | | | | | | | |
| $\bar{P}^{(2)}$ | — | — | — | — | 16 | 15 | 2.3 | 2.2 |
| $\bar{P}/L^{(3)}$ | — | — | — | — | | 0.6 | | 0.1 |

[1]100 Counts of $F_2$
[2]Permeability Coefficient for the Composite Membrane ($\times 10^{-10}$)
[3]Permeance of the fluorinated surface layer ($\times 10^{+5}$)

TABLE 5

| | SELECTIVITY | | | | | | | | |
|---|---|---|---|---|---|---|---|---|---|
| PTAGP Membrane | $R_1 = R_2 = R_3 = CH_3$ Control | Fluorinated[1] | $R_1 = CH_3$ $R_2 = R_3 =$ $R_4 = CH_2H_5$ Control | Fluorinated | $R_1 = CH_3$ $R_2 = R_3 = CH_3$ $R_4 = C_4H_9$ Control | Fluorinated | $R_1 = CH_3$ $R_2 = R_3 = CH_3$ $R_4 = C_6H_5$ Control | Fluorinated |
| $O_2/N_2$ | | | | | | | | | |
| $a^{(2)}$ | 1.5 | 6.7 | 1.2 | 5.0 | 2.9 | 2.1 | 2.9 | 5.1 |
| $a^{(3)}$ | | 7.1 | | 5.0 | | 0.4 | | — |
| $He/CH_4$ | | | | | | | | | |
| $a^{(2)}$ | 0.4 | 130 | 0.6 | 14 | 2.8 | 2.5 | 8.5 | 10.9 |
| $a^{(3)}$ | | 670 | | 44 | | 0.6 | | — |
| $H_2/CH_4$ | | | | | | | | | |
| $a^{(2)}$ | 1.0 | 150 | 1.4 | 28 | 4.3 | 3.6 | 13.1 | 18.2 |
| $a^{(3)}$ | | 225 | | 63 | | 0.7 | | — |
| $H_2/CO$ | | | | | | | | | |
| $a^{(2)}$ | 2.4 | 51 | 2.5 | 16 | 7.3 | 7.2 | 4.9 | 8.0 |
| $a^{(3)}$ | | 75 | | 31 | | 7.0 | | — |
| $H_2/Ar$ | | | | | | | | | |
| $a^{(2)}$ | — | — | — | — | 4.6 | 3.9 | 7.4 | 9.1 |
| $a^{(3)}$ | — | — | — | — | | 1.2 | | — |
| $CO_2/CH_4$ | | | | | | | | | |
| $a^{(2)}$ | 2.3 | 25 | 2.2 | 24 | 4.5 | 3.2 | 11.5 | 15.4 |
| $a^{(3)}$ | | 27 | | 39 | | 0.4 | | — |
| $Co_2/N_2$ | | | | | | | | | |
| $a^{(2)}$ | 6.1 | 11.1 | 4.7 | 19 | 9.5 | 6.4 | 10.7 | 21.2 |
| $a^{(3)}$ | | 11.4 | | 20 | | 0.8 | | — |

[1]100 Counts of $F_2$
[2]Selectivity based on Permeability Coefficient ($\bar{P}$) for the Composite Membrane
[3]Selectivity based on Permeance ($\bar{P}/L$) of the fluorinated surface layer

EXAMPLE 2

Several PTAGP polymer membranes were fluorinated with 100 counts of $F_2$ and a similar unfluorinated group was used as a control. Permeability ($\bar{P}$), permanence ($\bar{P}L$) and selectively ($a$) studies of various gases through the membranes were carried out in accordance with the procedures set out in example 1 above.

From the results reported in Tables 4 and 5 above, it can be seen that fluorine treatment greatly enhances the selectivity of the PTAGP membranes which contain smaller R groups bonded to the Ge atm. As the R groups become larger, i.e., $C_4$ and above, however, the effects of fluorination become diminished. Therefore, the use of the polymeric membranes described above for gas separation is preferably limited to fluorinated PTAGP membranes wherein $R_2$, $R_3$, and $R_4$ are all independently hydrogen or $C_3$ or smaller.

EXAMPLE 3

The same polymerization and membrane synthesis techniques described above were used to fabricate membranes having a polymer structure comprising TMGP and trimethylsilylpropyne (TMSP) copolymers.

Table 6 below indicates the polymerization times for the various copolymer combinations.

TABLE 6

| Mole % TMSP:TMGP | Polymerization Time* (sec.) |
|---|---|
| 100:0 | 15,000 |
| 98:2 | 32.8 |
| 95:5 | 15.6 |
| 90:10 | 10.5 |
| 75:25 | 8.5 |
| 50:50 | 3.2 |
| 10:90 | 1.6 |

TABLE 6-continued

| Mole % TMSP:TMGP | Polymerization Time* (sec.) |
|---|---|
| 0:100 | 2.3 |

*time required to achieve a state of gelatin such that stirring is impeded.

As can be seen from the above polymerization results, the presence of even a small amount of TMGP markedly accelerates the polymerization. This rapid polymerization allows for in-situ synthesis of thin film polymers which would be extremely difficult to make if only TMSP monomers are used.

Polytrimethylsilylpropyne, polytrimethylgermylpropyne, and two polymer membranes synthesized from both TMSP and TMGP monomers were fabricated and subjected to fluorine treatment as described above. The fluorinated membranes, as well as untreated membranes (controls) were tested for permeability, permeance and selectivity for various gases and gas mixtures.

The results of these tests are reported in Tables 7 and 8 below.

TABLE 7

| | | PERMEABILITY AND PERMEANCE | | | | | | | |
|---|---|---|---|---|---|---|---|---|---|
| | | 100% Si | | 9:1 (Si:Ge) | | 1:1 (Si:Ge) | | 100% Ge | |
| Membrane | | Control | Fluorinated[1] | Control | Fluorinated[2] | Control | Fluorinated[2] | Control | Fluorinated[2] |
| $H_2$ | | | | | | | | | |
| | $\bar{P}^{(3)}$ | 16150 | 6176 | 12742 | 3704 | 11218 | 2770 | 7138 | 2410 |
| | $\bar{P}/L^{(4)}$ | | 10.3 | | 10.5 | | 9.8 | | 13.5 |
| He | | | | | | | | | |
| | $\bar{P}^{(3)}$ | 6514 | 5122 | 5137 | 4193 | 4559 | 3127 | 2702 | 2160 |
| | $\bar{P}/L^{(4)}$ | | 24.6 | | 45.3 | | 26.5 | | 40.0 |
| $O_2$ | | | | | | | | | |
| | $\bar{P}^{(3)}$ | 10040 | 968 | 6908 | 350 | 5860 | 283 | 3954 | 248 |
| | $\bar{P}/L^{(4)}$ | | 1.10 | | 0.73 | | 0.79 | | 1.02 |
| $N_2$ | | | | | | | | | |
| | $\bar{P}^{(3)}$ | 6745 | 211 | 5381 | 63 | 4594 | 53 | 2610 | 37 |
| | $\bar{P}/L^{(4)}$ | | 0.22 | | 0.13 | | 0.14 | | 0.14 |
| $CH_4$ | | | | | | | | | |
| | $\bar{P}^{(3)}$ | 15986 | 115 | 12765 | 36 | 9311 | 24 | 6740 | 17 |
| | $\bar{P}/L^{(4)}$ | | 0.12 | | 0.05 | | 0.06 | | 0.06 |
| CO | | | | | | | | | |
| | $\bar{P}^{(3)}$ | 7743 | 257 | 5946 | 93 | 4984 | 75 | 2940 | 47 |
| | $\bar{P}/L^{(4)}$ | | 0.27 | | 0.19 | | 0.20 | | 0.18 |
| $CO_2$ | | | | | | | | | |
| | $\bar{P}^{(3)}$ | 33100 | 3718 | 24798 | 1148 | 22409 | 931 | 770 | 416 |
| | $\bar{P}/L^{(4)}$ | | 4.3 | | 2.39 | | 2.59 | | 1.59 |

[1] 125 Counts of $F_2$
[2] 100 Counts of $F_2$
[3] Permeability Coefficient for the Composite Membrane ($\times 10^{+10}$)
[4] Permeance of the fluorinated surface layer ($\times 10^{+5}$)

TABLE 8

| | | SELECTIVITY | | | | | | | |
|---|---|---|---|---|---|---|---|---|---|
| | | 100% Si | | 9:1 (Si:Ge) | | 1:1 (Si:Ge) | | 100% Ge | |
| Membrane | | Control | Fluorinated[1] | Control | Fluorinated[2] | Control | Fluorinated[2] | Control | Fluorinated[2] |
| $O_2/N_2$ | | | | | | | | | |
| | $\alpha^{(3)}$ | 1.49 | 4.58 | 1.28 | 5.5 | 1.27 | 5.3 | 1.51 | 6.70 |
| | $\alpha^{(4)}$ | | 4.91 | | 5.6 | | 5.7 | | 7.3 |
| $He/CH_4$ | | | | | | | | | |
| | $\alpha^{(3)}$ | 0.41 | 44.4 | 0.40 | 161 | 0.49 | 130 | 0.40 | 127 |
| | $\alpha^{(4)}$ | | 206 | | 906 | | 442 | | 632 |
| $H_2/CH_4$ | | | | | | | | | |
| | $\alpha^{(3)}$ | 1.03 | 53.6 | 0.99 | 142 | 1.2 | 115 | 1.06 | 142 |
| | $\alpha^{(4)}$ | | 87 | | 210 | | 163 | | 213 |
| $H_2/CO$ | | | | | | | | | |
| | $\alpha^{(3)}$ | 2.09 | 24.0 | 2.14 | 39.8 | 2.2 | 36.9 | 2.43 | 51.3 |
| | $\alpha^{(4)}$ | | 87 | | 210 | | 163 | | 213 |
| $CO_2/CH_4$ | | | | | | | | | |
| | $\alpha^{(3)}$ | 2.07 | 32.2 | 1.94 | 44.1 | 2.41 | 38.7 | 2.3 | 24.4 |
| | $\alpha^{(4)}$ | | 36 | | 47.8 | | 43.2 | | 25 |
| $CO_2/N_2$ | | | | | | | | | |
| | $\alpha^{(3)}$ | 4.91 | 17.6 | 4.61 | 18.2 | 4.88 | 17.5 | 6.04 | 11.2 |

TABLE 8-continued

| Membrane | 100% Si | | SELECTIVITY 9:1 (Si:Ge) | | 1:1 (Si:Ge) | | 100% Ge | |
|---|---|---|---|---|---|---|---|---|
| | Control | Fluorinated[1] | Control | Fluorinated[2] | Control | Fluorinated[2] | Control | Fluorinated[2] |
| $\alpha^{(4)}$ | 19 | | 18.3 | | 17.6 | | 11.4 | |

[1]125 Counts of $F_2$
[2]100 Counts of $F_2$
[3]Selectivity based on Permeability Coefficient ($\bar{P}$) for the Composite Membrane ($\times 10^{+10}$)
[4]Selectivity based on Permeance (P/L) of the fluorinated surface layer ($\times 10^{+5}$)

EXAMPLE 4

The fluorination techniques used to treat the polytrimethylgermylpropyne polymers were also used to treat silicon rubber and poly-2-nonyne polymers.

Silicone rubber which is a crosslinked polymer having the general structural formula:

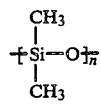

when formed into a membrane has been shown to be very permeable for many gases yet exhibits relatively low selectivities. A 5 mil thick membrane of commercial silicone rubber (MEM-100, lot #B-163, manufactured by General Electric Company) was fluorinated with a gas stream containing 0.5% $F_2$ gas for 45 minutes. The permeabilities and selectivities for various gases were tested for both the fluorinated membrane and an unfluorinated membrane. Gas permeability values and surface analysis data for the fluorinated and unfluorinated membranes are reported in Table 9 below.

TABLE 9

| Silicone Rubber Membranes | Unfluorinated | Fluorinated |
|---|---|---|
| $\bar{P}$ | | |
| Helium | 300 | 291 |
| Oxygen | 500 | 462 |
| Nitrogen | 250 | 183 |
| Methane | 800 | 523 |
| Surface Analysis by ESCA | | |
| % C | 50.8 | 53.4 |
| % O | 27.3 | 19.4 |
| % Si | 21.9 | 0.6 |
| % F | — | 26.4 |

The above permeability coefficient and surface analysis data indicate that the silicone rubber membrane is fluorinated, but that surface fluorination did not have a significant effect on permeability or selectivity of the membrane for the gases tested. Additionally, the fluorinated membrane eroded over time, making this polymer unsuitable for surface fluorination.

A sample of poly-2-nonyne was polymerized using a mixed $MoCl_5/P(Ph)_4$ catalyst system. The resulting polymer, having the general structural formula:

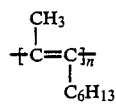

was formed into a dense membrane and treated with a $F_2/N_2$ gas stream comprising 0.5% $F_2$ gas for 15 minutes. Fluorinated and unfluorinated membrane samples were tested for permeability and selectivity for various gases, and a surface analysis was performed on both samples. The results of the tests and analyses are reported in Table 10 below.

TABLE 10

| Poly-2-nonyne Membranes | Unfluorinated | Fluorinated |
|---|---|---|
| $\bar{P}$ | | |
| Oxygen | 54.1 | 52.0 |
| Nitrogen | 17.9 | 21.8 |
| Helium | 70.3 | 62.0 |
| $\alpha$ | | |
| $O_2/N_2$ | 3.0 | 2.4 |
| $He/N_2$ | 3.9 | 2.8 |
| $He/O_2$ | 1.3 | 1.2 |
| Surface Analysis by ESCA | | |
| % C | 94.5 | 43.7 |
| % O | 5.0 | 6.2 |
| % F | — | 49.8 |

The poly-2-nonyne membrane, when treated with an $F_2/N_2$ reactive mixture, exhibited a highly fluorinated surface, but demonstrated no significant change in either permeability coefficient or selectivity for the gases tested.

The results of the above examples demonstrates the importance of both the basic polymer structure and the fluorination step in synthesizing a membrane having both high permeability and high selectivity for a wide range of gas mixtures.

Having thus described the present invention, what is now deemed appropriate for Letters Patent is set out in the following appended claims.

What is claimed is:

1. A polymer having the general structural formula:

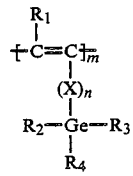

wherein $R_1$ is hydrogen or a $C_1$–$C_2$ alkyl group; $R_2$ and $R_3$ are independently linear or branched $C_1$–$C_6$ alkyl groups; $R_4$ is a linear or branched $C_1$–$C_{12}$ alkyl or aryl group; X is a $C_1$–$C_3$ alkyl group or phenyl; m is at least 100; and n is 0 or 1.

2. A polymer in accordance with claim 1 which is formed by polymerizing monomer units having the general structural formula:

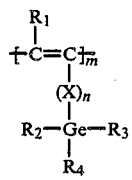

wherein $R_1$ is hydrogen or a $C_1$-$C_2$ alkyl group; $R_2$ and $R_3$ are independently linear or branched $C_1$-$C_6$ alkyl groups; $R_4$ is a linear or branched $C_1$-$C_{12}$ alkyl or aryl group; X is a $C_1$-$C_3$ alkyl group or phenyl; and n is 0 or 1.

3. A polymer in accordance with claim 1 wherein said polymer is cast into membrane form.

4. A polymer, cast into membrane form, in accordance with claim 3 which is employed in gas separation, liquid separation, pervaporation or ultrafiltration operations.

5. A polymer in accordance with claim 1 wherein $R_1$, $R_2$, $R_3$ and $R_4$ are methyl groups and n=0.

6. A copolymer containing structural units set out in claim 1 which also contains one or more different copolymerizable monomers.

7. A copolymer in accordance with claim 6 in which the various monomer units comprising the copolymer are arranged in an alternating, block or random configuration.

8. A copolymer in accordance with claim 7 wherein trialkylsilylacetylene derived monomer units comprise up to about 50% of the total polymer.

9. A polymer, cast into membrane form in accordance with claim 3 which is subsequently subjected to ultraviolet or electromagnetic treatment.

10. A polymer, cast into membrane form in accordance with claim 3 which is subsequently subjected to treatment in a plasma field.

11. A treated, semi-permeable, polymeric membrane having improved selectivity for use in separating components of a feed gas mixture, said membrane comprising a polymer, cast into membrane form, having the general structural formula:

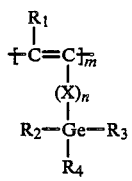

wherein $R_1$ is hydrogen or a $C_1$-$C_2$ alkyl group; $R_2$, $R_3$ and $R_4$ are independently linear or branched $C_1$-$C_3$ alkyl groups; X is a $C_1$-$C_3$ alkyl group or phenyl; m is at least 100; and n is 0 or 1, which has been treated with a reactive source of fluorine for a time sufficient to modify the membrane such that the $O_2/N_2$ selectivity ratio of the membrane is increased by at least 50% over that of the membrane prior to treatment with the reactive fluorine source.

12. A treated, semi-permeable, polymeric membrane in accordance with claim 11 wherein the reactive fluorine source is a gas stream containing between 0.01-25% fluorine gas.

13. A treated, semi-permeable, polymeric membrane in accordance with claim 12 wherein the reactive fluorine source is a gas stream containing between 0.1-2% fluorine gas.

14. A treated, semi-permeable, polymeric membrane in accordance with claim 11 which has been contacted with a reactive source of fluorine for a period of time between 10 seconds and 24 hours.

15. A treated, semi-permeable, polymeric membrane in accordance with claim 14 which has been contacted with a reactive source of fluorine for a period of time between 0.5 min and 120 min.

16. A treated, semi-permeable, polymeric membrane in accordance with claim 11 wherein said polymer cast into membrane form has a structural formula wherein n=0.

17. A treated, semi-permeable, polymeric membrane in accordance with claim 11 wherein said polymer cast into membrane form has a structural formula wherein $R_1$, $R_2$ and $R_3$ are $CH_3$ groups and $R_4$ is a linear or branched $C_1$-$C_3$ alkyl group.

18. A treated, semi-permeable, polymeric membrane in accordance with claim 17 wherein said polymer cast into membrane form has a structural formula where in n=0.

19. A treated, semi-permeable, polymeric membrane in accordance with claim 11 which is employed in gas separation, solvent separation, pervaporation or ultrafiltration operations.

20. A treated, semi-permeable, polymeric membrane in accordance with claim 11 wherein said polymer cast into membrane form also comprises a trialkylacetylene derived copolymer.

21. A treated, semi-permeable polymeric membrane in accordance with claim 20 wherein said copolymer is present in a concentration of between 10% to 98%.

22. A treated, semi-permeable, polymeric membrane in accordance with claim 11 in which the polymer cast into membrane form has the following structural formula:

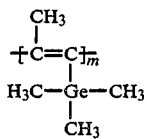

wherein m is at least 100.

23. A membrane in accordance with claim 11 wherein the polymer is cast into the form of an asymmetric membrane having a thin dense layer over a porous layer.

24. A membrane in accordance with claim 11 wherein the polymer, prior to treatment with a reactive source of fluorine is first coated onto the surface of a porous substrate.

25. A membrane in accordance with claim 24 wherein the porous substrate is in the form of a flat sheet or hollow fiber prior to being coated.

26. A membrane in accordance with claim 24 wherein the porous substrate is a polyolefine or polysulfone.

27. A membrane comprising two or more layers wherein at least one of the layers comprises the membrane structure set out in claim 11.

28. A process for separating a feed gas mixture containing at least two components having different permeabilities through a membrane, said process comprising bringing said feed gas mixture into contact with a treated, semi-permeable, polymeric membrane comprising a polymer, cast into membrane form, having the general structural formula:

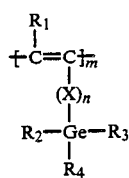

wherein $R_1$ is hydrogen or a $C_1$-$C_2$ alkyl group; $R_2$, $R_3$ and $R_4$ are independently linear or branched $C_1$-$C_3$ alkyl groups; X is a $C_1$-$C_3$ alkyl group or phenyl; m is at least 100; and n is 0 or 1, which has been treated with a reactive source of fluorine for a time sufficient to modify the membrane such that the $O_2/N_2$ selectivity ratio of the membrane is increased by at least 50% over that of the membrane prior to treatment with the reactive fluorine source, to separate the more permeable component as a permeate stream and concentrate the less permeable component as a reject stream.

29. A process in accordance with claim 28 wherein the reactive fluorine source is a gas stream containing between 0.01–25% fluorine gas.

30. A process in accordance with claim 29 wherein the reactive fluorine source is a gas stream containing between 0.1–2% fluorine gas.

31. A process in accordance with claim 28 wherein said treated, semi-permeable, polymeric membrane has been contacted with a reactive source of fluorine for a period of time between 10 seconds and 24 hours.

32. A process in accordance with claim 31 wherein said treated, semi-permeable, polymeric membrane has been contacted with a reactive source of fluorine for a period of time between 0.5 min and 120 min.

33. A process in accordance with claim 28 wherein said feed gas mixture is brought into contact with a treated, semi-permeable, polymeric membrane comprising a polymer, cast into membrane form, having a structural formula wherein n=0.

34. A process in accordance with claim 33 wherein said feed gas mixture is brought into contact with a treated, semi-permeable, polymeric membrane comprising a polymer, cast into membrane form, having a structural formula wherein $R_1$, $R_2$ and $R_3$ are $CH_3$ groups and $R_4$ is a linear or branched $C_1$-$C_3$ alkyl group.

35. A process in accordance with claim 34 wherein said feed gas mixture is brought into contact with a treated, semi-permeable, polymeric membrane comprising a polymer, cast into membrane form, having the structural formula:

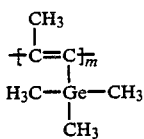

wherein m is at least 100.

36. A process in accordance with claim 28 wherein said polymer, cast into membrane form, also comprises one or more copolymers.

37. A process in accordance with claim 36 wherein said polymer, cast into membrane form comprises a trialkylacetylene derived copolymer.

38. A process in accordance with claim 28 wherein the feed gas mixture is selected from the group consisting of:
$O_2/N_2$, $He/CH_4$, $H_2/CH_4$, $H_2/CO$, $CO_2/CH_4$, $CO_2/N_2$, $H_2/N_2$ and $He/N_2$.

39. A method of producing a semi-permeable, polymeric membrane having improved selectivity for use in separating components of a feed gas mixture, said method comprising:
(1) casting into membrane form a polymer having the general structural formula:

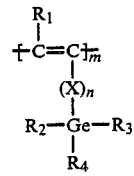

wherein $R_1$ is hydrogen or a $C_1$-$C_2$ alkyl group; $R_2$, $R_3$ and $R_4$ are independently linear or branched $C_1$-$C_3$ alkyl groups; X is a $C_1$-$C_3$ alkyl group or phenyl; m is at least 100; and n is 0 or 1; and
(2) treating said polymer in membrane form with a reactive source of fluorine for a time sufficient to modify the membrane such that the $O_2/N_2$ selectivity ratio of the membrane is increased by at least 50% over that of the membrane prior to treatment with the reactive fluorine source.

40. A method in accordance with claim 39 wherein the reactive source of fluorine is a gas stream containing between 0.01–25% fluorine gas.

41. A method in accordance with claim 40 wherein the polymer in membrane form is treated with a reactive source of fluorine for a period of time between 10 seconds and 24 hours.

42. A method in accordance with claim 39 wherein the polymer cast into membrane form has the general structural formula wherein $R_1$, $R_2$ and $R_3$ are $CH_3$ groups, $R_4$ is a linear or branched $C_1$-$C_3$ alkyl group and n=0.

43. A method in accordance with claim 39 wherein the polymer cast into membrane form has the following structural formula:

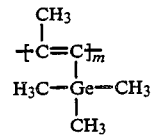

wherein m is at least 100.

44. A method in accordance with claim 39 wherein said polymer in membrane form is treated with a reactive source of fluorine under ambient conditions of temperature and pressure.

45. A method in accordance with claim 39 wherein said polymer in membrane form is treated with a reactive source of fluorine at elevated temperatures and in the presence of a plasma field or electromagnetic radiation.

46. A method in accordance with claim 39 wherein the polymer, cast into membrane form, comprises two or more copolymers.

47. A method in accordance with claim 46 wherein the polymer, cast into membrane form, comprises a trialkylsilylacetylene derived copolymer.

* * * * *

UNITED STATES PATENT AND TRADEMARK OFFICE
CERTIFICATE OF CORRECTION

PATENT NO. : 4,759,776

DATED : July 26, 1988

INVENTOR(S) : Michael Langsam et al

It is certified that error appears in the above-identified patent and that said Letters Patent is hereby corrected as shown below:

Column 15, Line 4
    Delete subscript "m"

Signed and Sealed this

Twenty-seventh Day of March, 1990

Attest:

JEFFREY M. SAMUELS

*Attesting Officer*      *Acting Commissioner of Patents and Trademarks*